United States Patent [19]

Peters et al.

[11] Patent Number: 5,336,900
[45] Date of Patent: Aug. 9, 1994

[54] SINGLE CHANNEL, DUAL WAVELENGTH LASER RANGEFINDER APPARATUS

[75] Inventors: Rodney E. Peters, Apopka; Michael G. Croteau, Ocoee, both of Fla.

[73] Assignee: Litton Systems, Inc., Beverly Hills, Calif.

[21] Appl. No.: 7,494

[22] Filed: Jan. 22, 1993

[51] Int. Cl.$^5$ ............................................. G01C 3/08
[52] U.S. Cl. ............................................. 250/561; 356/5; 250/226
[58] Field of Search ............... 250/561, 226, 222.1; 356/1, 4, 5, 28.5; 372/23, 25

[56] References Cited

U.S. PATENT DOCUMENTS

| | | | |
|---|---|---|---|
| 4,367,552 | 1/1983 | Jacobson | 372/23 |
| 4,851,661 | 7/1989 | Everett, Jr. | 250/221 |
| 4,904,043 | 2/1990 | Schweizer | 350/96.18 |
| 4,948,967 | 8/1990 | Naito et al. | 250/561 X |
| 4,998,012 | 3/1991 | Kruse | 250/214 |
| 5,047,620 | 9/1991 | Durvasula et al. | 250/226 X |
| 5,142,401 | 8/1992 | Shen et al. | 359/189 |
| 5,206,697 | 4/1993 | Schwartz | 356/5 |

*Primary Examiner*—David C. Nelms
*Assistant Examiner*—John R. Lee
*Attorney, Agent, or Firm*—William M. Hobby, III

[57] ABSTRACT

A laser rangefinder apparatus is provided which includes a laser transmitter for transmitting a coherent light pulse exhibiting one of two different wavelengths over an optical path to a target. The particular wavelength of the laser light pulse is selectable by the user between two different wavelengths. The transmitted light pulse is reflected from the target as a reflected pulse and travels back to the laser rangefinder over the same optical path. The reflected light pulse is provided to a laser receiver including a fiber optic interface which supplies the pulse to a fiber optic interface cable. The fiber optic interface cable supplies the reflected pulse to a wideband photodetector to form a single channel capable of sensing each of the two wavelengths. The single channel configuration of the rangefinder dramatically reduces the parts count of the rangefinder as compared with prior rangefinders. The rangefinder includes a range processing unit which performs the distance to target calculation and displays the resultant distance to the user. The fiber optic interface permits great flexibility in the placement of the laser receiver with respect to the laser transmitter of the rangefinder.

2 Claims, 2 Drawing Sheets

SINGLE CHANNEL, DUAL WAVELENGTH LASER RANGEFINDER APPARATUS

CROSS-REFERENCE TO RELATED PATENT APPLICATIONS

This patent application is related to U.S. patent application Ser. No. 07/997,729, filed Dec. 30, 1992 by Michael G. Croteau and Rodney E. Peters and entitled Laser Rangefinder Apparatus With Fiber Optic Interface, the disclosure of which is incorporated herein by reference.

BACKGROUND OF THE INVENTION

This invention relates in general to optical transceivers and, more particularly, to laser rangefinders.

A laser rangefinder is an optical transceiver which is capable of measuring the distance between the rangefinder and a target in the distance. The laser rangefinder includes a laser light source or laser transmitter, and further includes a photodetector or laser receiver. Typically, the laser transmitter irradiates the target with incident laser light pulses and the laser receiver receives the reflected light pulses. A signal processor in the rangefinder records the time between transmission of a pulse by the laser transmitter and reception of the reflected pulse back at the rangefinder receiver. The signal processor then uses this time difference to calculate the distance between the rangefinder and the target.

Some conventional rangefinders are capable of transmitting and receiving laser light pulses exhibiting two different wavelengths which will be referred to as first and second wavelengths. In actual battlefield conditions, the user typically selects the first wavelength which is chosen for maximum range. Although resulting in maximum range, a first wavelength, $\lambda 1$, of 1.06 $\mu$m for example exhibits high energy content which may not be suitable for use in battlefield game exercises due to concern for visual safety. In this instance, the user selects the second wavelength, $\lambda 2$, for example 1.54 $\mu$m, which is significantly longer and which exhibits a lower energy content than the first wavelength. Use of the second wavelength generally results in significantly reduced range in prior rangefinders.

To accommodate transmission and reception of two different wavelengths, prior rangefinders have employed two separate receive channels such as seen in the rangefinder of FIG. 1. In that rangefinder, a beam splitter is used to provide the return laser pulse to the two receive channels which include respective photodetectors. Such two channel rangefinders typically include control circuitry to switch to the appropriate channel according to which of the two wavelengths is to be detected. This results in significant switching overhead. Needless to say, such dual channel, dual wavelength laser rangefinders have a significantly higher parts count and cost than their single wavelength counterparts.

In conventional laser rangefinders, great care must be taken to mechanically and optically align the laser transmitter and the laser receiver with respect to each other. That is, optical coupling in prior laser rangefinders was accomplished through the use of discrete coupling optics, namely lenses, which necessitated tight mechanical tolerancing of receivers and transmitters to maintain boresight and field of view (FOV) requirements. Additional fixed optics were also required to ensure power densities which did not exceed the damage threshold level of the photodetector in the laser receiver of the rangefinder. Moreover, with such rangefinders there was little flexibility in the placement of the laser receiver with respect to the laser transmitter.

SUMMARY OF THE INVENTION

One object of the present invention is to provide a laser rangefinder which is capable of receiving two different wavelengths.

Another object of the present invention is to provide a laser rangefinder with a substantially reduced parts count.

Yet another object of the present invention is to provide a laser rangefinder with reduced weight and cost.

Still another object of the present invention is to provide a laser rangefinder which permits flexibility in selection of the location of the laser receiver with respect to the laser transmitter.

Yet another object of the present invention is to provide a laser rangefinder which protects the photodetector of the laser receiver from focussed laser light.

In accordance with the present invention, an optical transceiver is provided for transmitting a light pulse to a target and for receiving a reflected light pulse from the target. The optical transceiver includes a dual wavelength optical transmitter for transmitting a coherent light pulse along an optical path to the target, the wavelength of the coherent light pulse being selectable between first and second wavelengths. In this transceiver, the light pulse is reflected by the target as a reflected light pulse back along the optical path. The transceiver includes a single channel, dual wavelength optical receiver for receiving the reflected light pulse. The optical receiver includes a single, wideband photodetector exhibiting a sufficiently wide bandwidth to detect both reflected light pulses exhibiting the first wavelength and light pulses exhibiting the second wavelength. The photodetector provides a detect signal corresponding to the amplitude of the light pulse supplied thereto. The receiver still further includes a very low noise preamplifier coupled to the photodetector to amplify the detect signal.

BRIEF DESCRIPTION OF THE DRAWINGS

The features of the invention believed to be novel are specifically set forth in the appended claims. However, the invention itself, both as to its structure and method of operation, may best be understood by referring to the following description and the accompanying drawings.

DETAILED DESCRIPTION OF THE INVENTION

Figure 1:
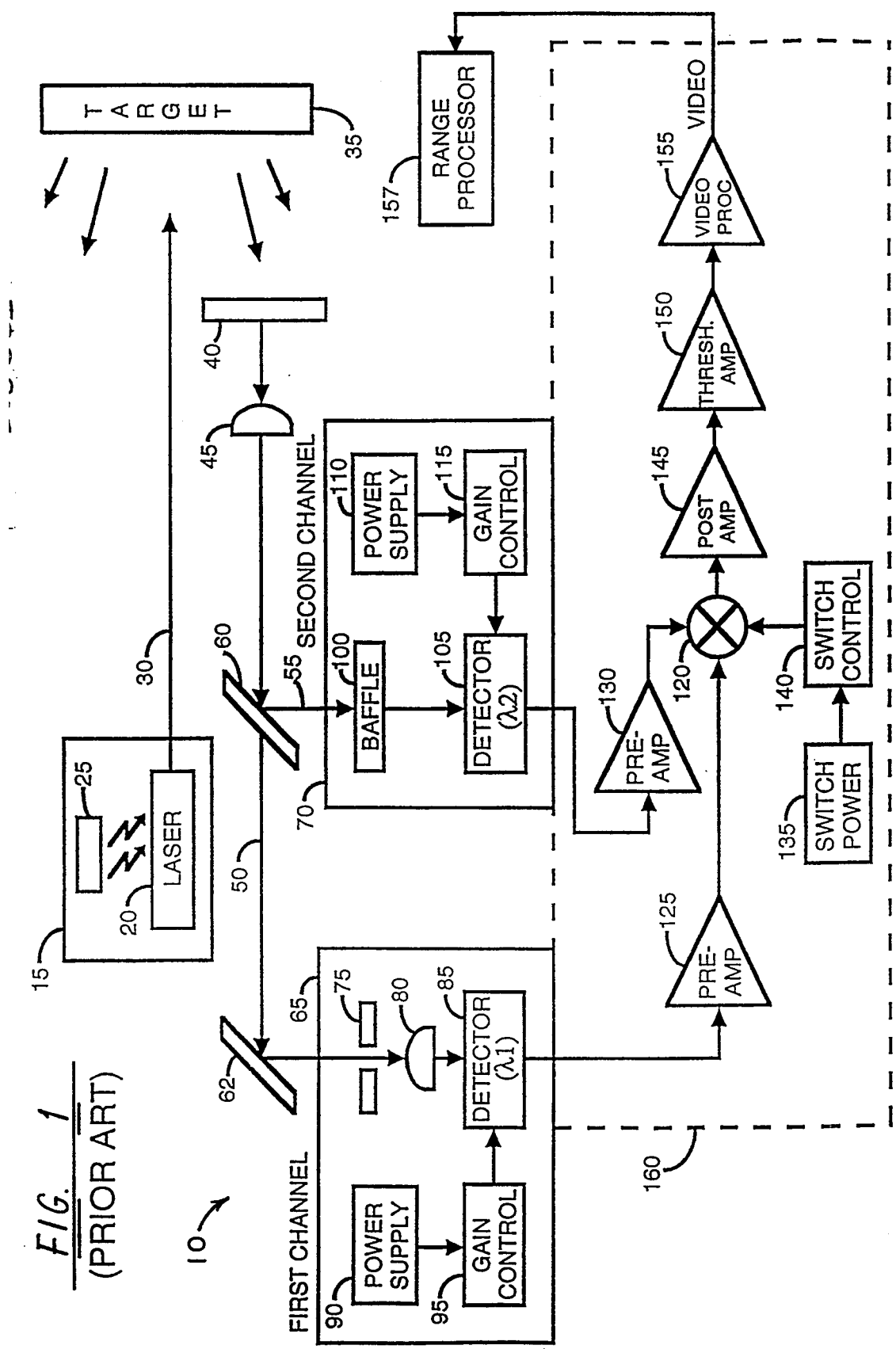
FIG. 1 is a block diagram of a conventional two channel, dual wavelength laser rangefinder.

Before discussing the single channel, dual wavelength laser rangefinder of the present invention in detail, it is helpful to first discuss a typical conventional dual channel, dual wavelength laser rangefinder apparatus such as that shown in FIG. 1 as rangefinder 10.

Rangefinder 10 includes a laser transmitter 15 having a laser rod 20 which is excited by a flash lamp 25. Laser transmitter 15 generates a laser light pulse 30 exhibiting one of two different wavelengths, $\lambda 1$ and $\lambda 2$, which are selectable by the user. Light pulse 30 reflects off target 35. The resultant reflected laser light pulse enters a bandpass filter 40 of the receiver of rangefinder 10. After being focussed by lens 45, the received laser pulse is split into two paths 50 and 55 by a beam splitter 60. The pulse on path 50 is deflected by mirror 62 to enter a first channel 65 which processes pulses exhibiting a $\lambda 1$ wavelength. In contrast, the pulse on path 55 enters a second channel 70 which processes pulses exhibiting a $\lambda 2$ wavelength. The pulse in the first channel is referred to as the first channel pulse and the pulse in the second channel is referred to as the second channel pulse.

The first channel pulse passes through a field stop 75 to prevent off-axis backscatter signals from entering first channel 65. The first channel pulse then passes through a field lens 80 which focusses the pulse on a photodetector 85 which is sensitive to the $\lambda 1$ wavelength. A power supply 90 and gain control 95 are coupled to detector 85 as shown. Power supply 90 supplies power to detector 85 while gain control 95 adjusts the detector power to the proper bias voltage level for the detector to operate at the optimal gain. Photodetector 85 is typically a silicon or germanium avalanche diode which exhibits a relatively narrow bandwidth.

The second channel pulse passes through a baffle 100 to a photodetector 105 which is similar to photodetector 85 except that photodetector 105 is capable of detecting laser pulses exhibiting the $\lambda 2$ wavelength. A power supply 110 and gain control 115 are coupled to detector 85 as shown.

The outputs of first channel photodetector 85 and second channel photodetector 105 are coupled to respective inputs of a channel switch 120 by preamplifiers 125 and 130 as shown in FIG. 1. A switch power supply 135 and a switch control circuit 140 are coupled to channel switch 120. Power supply 135 supplies power to switch 120 while switch control circuit 140 issues the appropriate control signals to switch 120 to cause switch 120 to connect the output of first channel 70 to post amplifier 145 or to connect the output of second channel 65 to post amplifier 145. In this manner, the user determines whether rangefinder 10 is to receive a $\lambda 1$ pulse or a $\lambda 2$ pulse. In actual practice, the switching is done automatically such that when the user selects a $\lambda 1$ pulse to be transmitted, then switch 120 is set to pass first channel signals and when the user selects a $\lambda 2$ pulse to be transmitted, then switch 120 is set to pass first channel signals.

The output of post amplifier 145 is coupled to the input of a threshold amplifier 150 which detects the amplitude of the return pulse passing therethrough to determine if valid target information is present.

The output of threshold amplifier 150 is coupled to the input of a video processor 155 which conditions the target return pulse applied thereto to generate a processed signal. Video processor 155 provides the processed signal to a range processing unit 157 which performs the actual distance to target calculation.

For convenience, pre-amp 125, pre-amp 130, switch power supply 135, switch control circuit 140, switch 120, post amplifier 145, threshold amplifier 150 and video processor 155 are situated on a common circuit board 160 as indicated by dashed lines in FIG. 1. Although preamplifiers 125 and 130 are located on circuit board 160, they may be considered to be parts of the first and second channels, respectively.

From the above it will be appreciated that a relatively high parts count and high system complexity are associated with the conventional dual channel, dual wavelength laser rangefinder of FIG. 1. Clearly a less complex alternative is very desirable both in terms of decreased weight and cost and in terms increased reliability.

Figure 2:
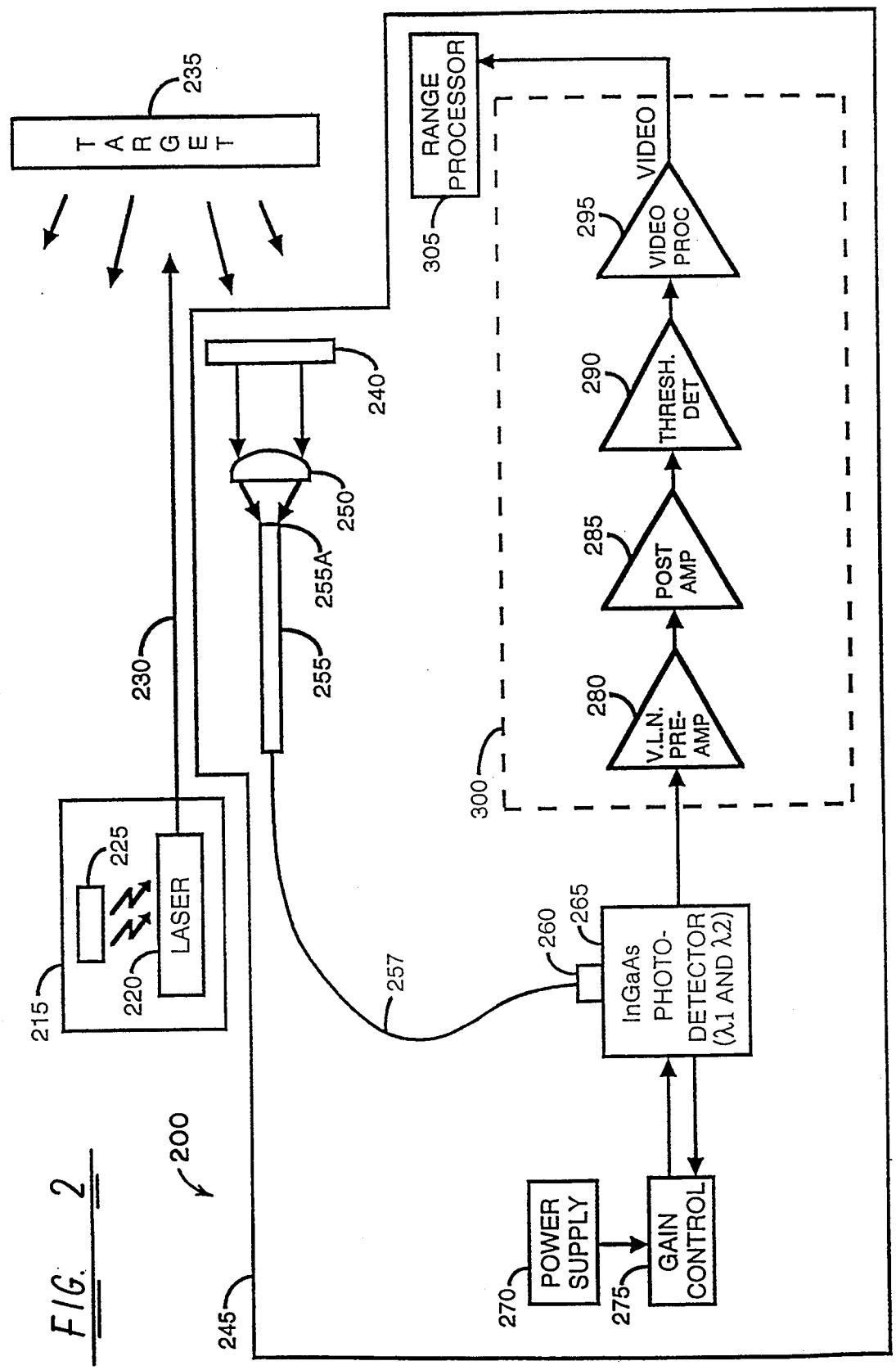
FIG. 2 is a block diagram of single channel, dual wavelength laser rangefinder of the present invention.

FIG. 2 shows a single channel, dual wavelength laser rangefinder 200 which meets the above expressed objectives. Rangefinder 200 includes a laser transmitter 215 having a laser rod 220 which is excited by a flash lamp 225. Laser transmitter 215 generates a laser light pulse 230 exhibiting one of two different wavelengths, $\lambda 1$ and $\lambda 2$, which are selectable by the user. Light pulse 230 reflects off target 235 and the resultant reflected laser light pulse enters a bandpass filter 240 of receiver 245. Bandpass filter 240 reduces out-of-band optical energy which would otherwise tend to increase the noise power density of the receiver and reduce the overall signal-to-noise ratio.

Receiver 245 includes a lens 250 situated adjacent filter 240. Lens 250 focusses the return light pulse on a fiber optic coupling 255 situated adjacent lens 250. In this particular embodiment, lens 250 is an achromat focusing lens which provides a very small focus (for the multiple wavelengths employed by the rangefinder) at fiber optic coupling face 255A.

A fiber optic cable 257 or fiber optic waveguide is coupled between fiber optic coupling 255 and a fiber optic coupling 260 on a wideband photo detector 265. In this manner, the return light pulse is provided to photodetector 265. Photodetector 265 is a wideband InGaAs avalanche photodiode device which is capable of detecting light pulses at both the $\lambda 1$ and $\lambda 2$ wavelengths. Photodetector 265 detects the optical return signal from the target and produces a photo-generated current which is representative of the intensity of the optical return signal. The output signal of photodetector 265 is referred to as the converted return pulse signal.

Photodetector 265 exhibits a broadband gain characteristic which is sufficiently wide to detect $\lambda 1$ and $\lambda 2$ wavelengths which are substantially apart in wavelength with respect to each other. For example, in one embodiment the $\lambda 2$ wavelength is approximately 50% larger than the $\lambda 1$ wavelength and photodetector 265 is sufficiently broadband to detect both wavelengths. More particularly, in one embodiment wherein $\lambda 1$ is 1.06 $\mu$m and $\lambda 2$ is 1.54 $\mu$m, photodector 265 detects both wavelengths.

A power supply 270 and a gain control circuit 275 are coupled to photodetector 265 as shown. Power supply 270 provides a source of power for photodetector 265. Gain control circuit 275 senses the temperature of photodetector 265 and sets the avalanche gain of the InGaAs photodiode for correct optical pulse detection sensitivity based upon a predetermined range profile analysis which predicts the amplitude or magnitude of the reflected optical pulse returned from the target. Such range profile analyses are readily conducted by those skilled in the art.

The output of photodetector 265 is coupled to a very low noise preamplifier 280. It has been found that in order for the rangefinder of the invention to perform acceptably, it is important that a very low noise (V.L.N.) preamplifier 280 be employed in conjunction with wide band photodetector 265. More particularly, very low noise preamplifier 280 typically exhibits a spectral noise current density of approximately 0.75 pico Amps/$\sqrt{Hz}$ over the matched filter bandwidth of the transmitter output pulse.

The output of very low noise preamplifier 280 is coupled to the input of a post amplifier 285 which provides high gain amplification of the converted return pulse signal. The output of post amplifier 285 is coupled to a threshold detector 290 which checks the amplitude of the amplified converted return pulse signal provided thereto to see if that signal exceeds a predetermined threshold level. If the amplified converted return pulse signal is found to exceed the threshold, then threshold detector 290 generates an output signal indicating that valid target information is present.

The output of threshold detector 290 is coupled to a video processor 295 which conditions the valid target signal from detector 290. The output signal of video processor 295 is designated as VIDEO which is a signal indicating whether or not valid target range information has been detected. The video processor differentially transmits the electrical analog of a valid optical pulse target return to the range processor. This provides accurate pulse reproduction by reducing electromagnetic interference which could degrade the transmitted signal. For convenience, very low noise preamplifier 280, post amplifier 285, threshold detector 290 and video processor 295 are all included on the same circuit board 300 as indicated by the dashed lines in FIG. 2.

The output of video processor 295 is coupled to a range processing unit 305 which performs the actual distance to target calculation using the time between the transmission of the laser pulse by laser transmitter 215 and the time the return optical signal is received by laser receiver 245 as indicated by the VIDEO signal provided thereto.

The foregoing has described a dual wavelength optical transceiver or laser rangefinder with numerous advantages over its predecessors. The unique single channel, dual wavelength design with a broadband InGaAs photodetector dramatically reduces parts count as compared with other dual wavelength rangefinders. In comparing the conventional dual wavelength rangefinder of FIG. 1 with the rangefinder of the invention in FIG. 2, it can be seen that a power supply, gain control circuit, a mirror, a field stop, a field lens, a baffle, a photodetector and preamp have all been eliminated from the channels. Moreover, a switch power supply, switch control circuit, switch and all there attendant switching overhead have been eliminated by the rangefinder of the invention.

It is noted that fiber optic waveguide 257 transmits the return optical signal to photodetector 265 with a high transmission characteristic, namely more than 90% of the optical return signal at both $\lambda 1$ and $\lambda 2$ wavelengths. Fiber optic waveguide 257 also provides definition of the field of view of the receiver and protection of the photodetector from high peak power returns. The photodetector of the laser receiver is protected from focussed laser light by the fiber optic waveguide since the light output of the fiber optic waveguide is uniformly spread over the entire active area of the photodetector. This advantageously eliminates the need for a field lens/field stop assembly.

The laser rangefinder of the present invention provides nearly the same range when detecting longer wavelength $\lambda 2$ reflected pulse as did prior detectors detecting the higher energy $\lambda 1$ pulses. Moreover, the laser rangefinder of the invention permits great flexibility in the selection of the location of most of the components of the laser receiver with respect to the laser transmitter. The disclosed rangefinder also reduces close mechanical tolerancing in the placement of most of the components of the laser receiver with respect to the laser transmitter. It is also noted that as an alternative to the fiber optic coupling employed between achromatic lens 250 and photodetector 265, bulk optic coupling with discrete components could also be employed, as long as appropriate mechanical alignment and tolerancing between these two elements is provided.

While only certain preferred features of the invention have been shown by way of illustration, many modifications and changes will occur to those skilled in the art. It is, therefore, to be understood that the present claims are intended to cover all such modifications and changes which fall within the true spirit of the invention.

We claim:

1. An optical transceiver for transmitting a light pulse to a target and for receiving a reflected light pulse from said target comprising:

a dual wavelength optical transmitter for transmitting a coherent light pulse along an optical path to a target, the wavelength of said coherent light pulse being selectable between first and second wavelengths, said light pulse being reflected by said target as a reflected light pulse back along said optical path;

a single, wideband photodetector exhibiting a sufficiently wide bandwidth to detect both reflected light pulses exhibiting said first wavelength and reflected light pulses exhibiting said second wavelength, said photodetector providing a detect signal corresponding to the amplitude of the light pulse supplied thereto;

a very low noise preamplifier coupled to said photodetector to amplify said detect signal;

a fiber optic cable having first and second ends, the first end of said cable being positioned to capture reflected light pulses; and an achromatic lens for capturing said reflected light pulses and for focusing said reflected light pulses on the first end of said fiber optic cable, the second end of said fiber optic cable being coupled to said single photodetector.

2. The optical transceiver of claim 1 wherein said photodetector comprises an InGaAs wideband photodetector.

* * * * *